United States Patent [19]

O'Brien

[11] 4,307,063
[45] Dec. 22, 1981

[54] FLUID CONTACTING APPARATUS

[75] Inventor: Dennis E. O'Brien, Arlington Heights, Ill.

[73] Assignee: UOP Inc., Des Plaines, Ill.

[21] Appl. No.: 173,560

[22] Filed: Jul. 30, 1980

[51] Int. Cl.$^3$ .............................................. B01J 8/04
[52] U.S. Cl. ..................................... 422/256; 261/94
[58] Field of Search ...................... 422/255, 256, 260; 261/94, 95; 210/634, 284–286; 196/46

[56] References Cited

U.S. PATENT DOCUMENTS

| 2,332,224 | 10/1943 | Heath et al. | 261/94 |
| 2,400,962 | 5/1946 | Thompson | 23/270.5 |
| 2,610,108 | 9/1952 | Packie | 23/270.5 |
| 2,623,183 | 12/1952 | Buck | 250/83 |
| 2,813,010 | 11/1957 | Weber | 422/256 |
| 2,851,396 | 9/1958 | Myers, Jr. | 422/256 X |
| 2,895,809 | 7/1959 | Pohlenz | 23/270.5 |
| 2,921,020 | 1/1960 | Urban et al. | 208/205 |
| 4,019,869 | 4/1977 | Morris | 422/256 |

Primary Examiner—William A. Cuchinski, Jr.
Attorney, Agent, or Firm—James R. Hoatson, Jr.; John F. Spears, Jr.; William H. Page, II

[57] ABSTRACT

An apparatus for contacting two immiscible fluids is disclosed. A liquid stream enters the top of the apparatus and travels downward within an annular bed of packing. A vapor stream or a less dense liquid stream enters the bottom of the apparatus and travels upward making many radial flow passes succeedingly higher parts of the annular bed. The sigmoid flow of the rising stream is channeled by horizontal disks within the open central volume of the annular bed and by horizontal open-centered rings which surround the annular bed at staggered elevations.

1 Claim, 3 Drawing Figures

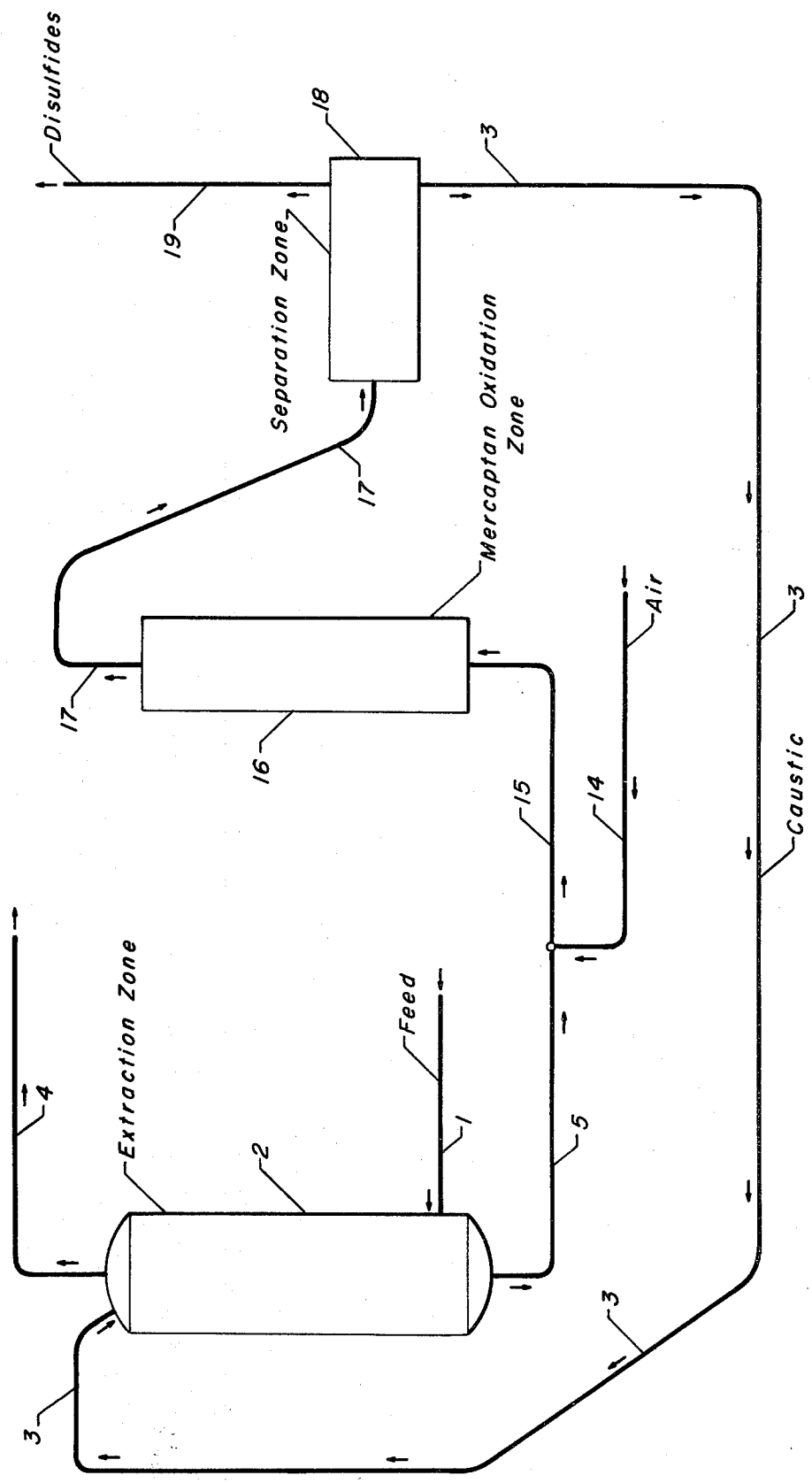

FLUID CONTACTING APPARATUS

FIELD OF THE INVENTION

The invention relates to a liquid-liquid extraction process in which there is countercurrent contacting of a rising stream with a descending liquid stream. These processes include the removal of mercaptans from hydrocarbon feed streams through the use of aqueous alkaline or amine solutions and the separation of aromatic hydrocarbons from non-aromatic hydrocarbons using selective solvents. These processes are described in U.S. Patents classified in Classes 208-311 to 208-337 and 210-21 and 210-22. The invention also relates to a process in which a descending liquid stream contacts a rising vapor stream to remove a chemical substance from the vapor stream or to promote a reaction between components of the vapor stream and the liquid stream.

The invention is specifically directed to a vertical fluid contacting apparatus containing an annular bed of packing and horizontal baffles which may be used as a liquid-liquid extraction column. References concerned with this general type of apparatus include U.S. Patents classified in Classes 23-267R to 23-271.

PRIOR ART

Liquid-liquid extraction is a well established process used commercially in the chemical, petroleum and petrochemical industries. It is often utilized when distillatory separation is more expensive or is impractical. A very extensive review of the art is contained in a number of articles published as pages 49–104 of *Chemical Engineering Progress*, (Vol. 62. No. 9) September, 1966. Instruction in the design of extraction processes and the selection of suitable equipment is provided in standard reference materials such as *The Chemical Engineers' Handbook*, 4th Ed., McGraw-Hill Publishing Co. and Treybal, *Mass Transfer Operations*, 2d Ed., McGraw-Hill Publishing Co.

Processes for the removal of sulfur compounds, such as mercaptans, from a hydrocarbon feed stream by liquid-liquid extraction with an aqueous alkaline solution which is subsequently regenerated are described in U.S. Pat. Nos. 2,921,020 (Cl. 208-205); 2,988,500 (Cl. 208-206); 3,108,081 (Cl. 254-428); 3,260,665 (Cl. 208-206); 3,409,543 (Cl. 208-234); 3,574,093; 3,923,645 and 4,040,947 (Cl. 208-235). Other separatory processes using liquid-liquid extraction are also well developed. For instance, the recovery of aromatic hydrocarbons from a mixture of aromatic and nonaromatic hydrocarbons is described in U.S. Pat. Nos. 3,652,452 and 3,844,902.

One of the commonly used types of extraction apparatus comprises a vertical cylindrical vessel containing a number of horizontal liquid support trays. This type of apparatus often includes either downcomers through which the descending liquid flows or guides for the rising liquid phase. Examples of this type of extraction apparatus are contained in U.S. Pat. Nos. 2,610,108 (Cl. 23-270.5); 2,623,813; 2,699,505 and 2,895,809.

The extraction apparatus presented in U.S. Pat. No. 2,400,962 is relevant because of the "disk-and-doughnut" design which is employed. This design is formed by alternating horizontal disks and open-centered (annular) rings which are vertically spaced apart in a manner similar to that of the subject invention. The horizontal elements are imperforate, and the apparatus is normally referred to as a baffle tower.

An additional type of extraction column known to those skilled in the art is the packed column. These columns normally contain a large cylindrical bed of packing (contacting media) through which the countercurrently flowing fluids travel in a vertical direction.

DESCRIPTION OF THE DRAWING

FIG. 3 is a schematic diagram of a process which utilizes the subject apparatus in the extraction of mercaptans from a hydrocarbon feed stream.

Referring now to FIG. 1, a feed stream enters the apparatus through a conduit 1 and is directed into a lower central portion of the internal volume of an outer vessel 2 through a flow directing means 13. The feed stream, which may be either a liquid or a vapor, does not flow downward as it is less dense than the second fluid which is present within the apparatus. The entering feed stream is received into an open-bottom cylindrical chamber having a vertical side wall formed by the porous particle retention screen 10 and an imperforate upper surface formed by the circular disk 7 which engages the screen 10.

Figure 1:
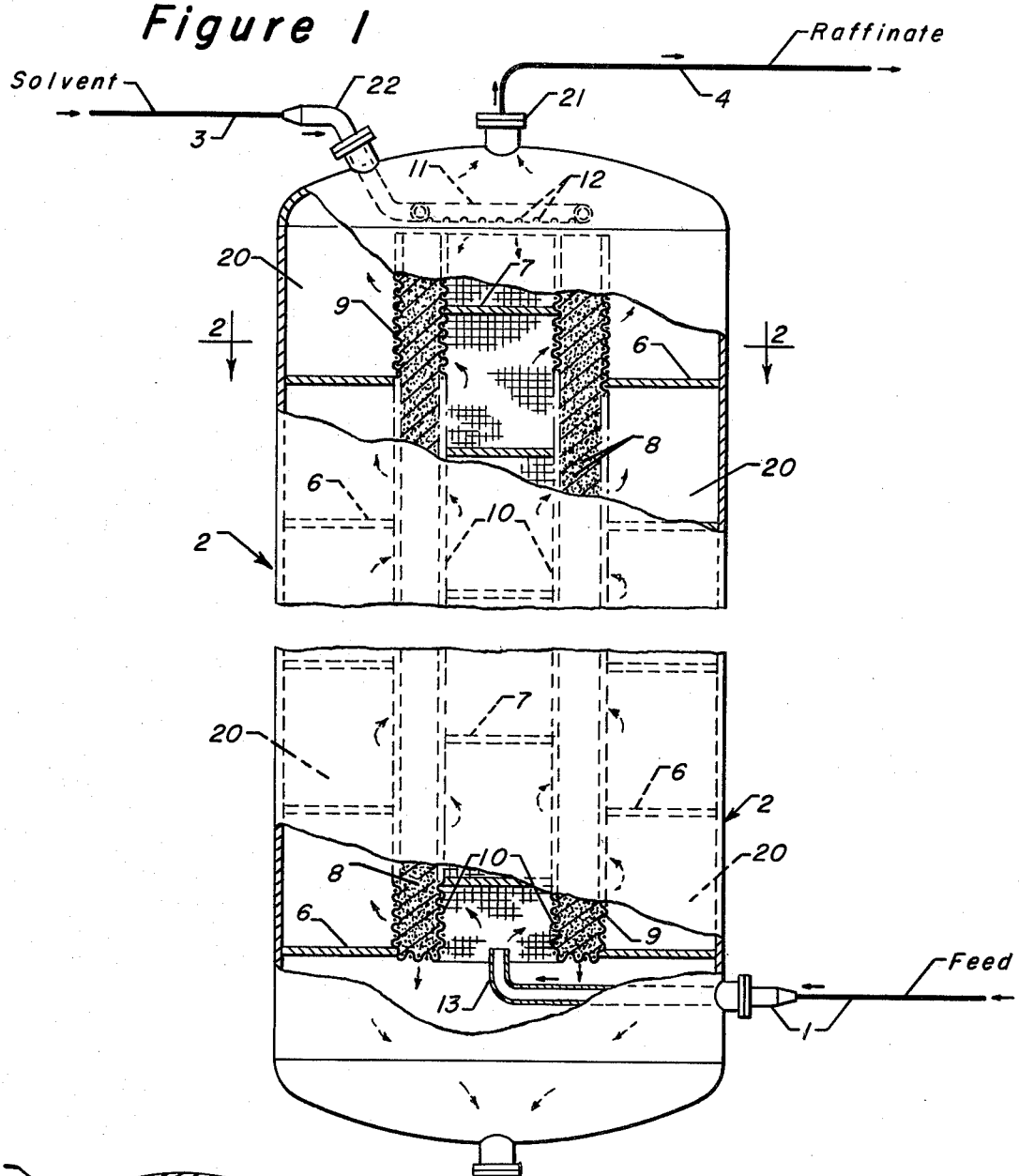
FIG. 1 is a cross-sectional view taken along a vertical plane passing through the center of the subject apparatus, which may be used in the subject process.

It is the natural tendency of the entering feed stream to rise upward through the apparatus. To do this, the feed stream passes through the screen 10 and an annular bed of contacting media 8. The feed stream flows radially outward through an outer screen 9 into an annular volume 20 located between the screen 9 and the inner surface of the vertical side wall of the outer vessel 2. The fluid stream derived from the feed stream may now rise above the level of the lowermost circular disk 7 but cannot arise above the imperforate annular ring 6 which is located a short distance above the point at which the fluid stream entered the annular volume 20. The fluid stream must therefore reverse its direction and pass radially inward through both porous screens and the bed of contacting media. In this manner, the less dense liquid gradually moves upward through the column in a circuitous sigmoid path which includes a large number of passages through the annular bed of contacting media. The less dense fluid will eventually rise to the top of the outer vessel. It then leaves the outer vessel through the outlet 21 and emerges as a raffinate stream removed through line 4.

A liquid phase solvent stream from line 3 is passed into the top of the outer vessel through the inlet conduit 22. The solvent stream enters a circular horizontal liquid distributor 11 and is uniformly distributed directly over the top of the annular bed of contacting media through a plurality of small openings 12 spaced around the bottom of the distributor. The solvent stream flows downward within the bed of contacting media and therefore passes through multiple contacting stages with the rising less dense fluid in an overall countercurrent flow system. The solvent stream emerges through a porous bottom screen which supports the annular bed of contacting media and is removed from the bottom of the outer vessel through line 5.

Figure 2:
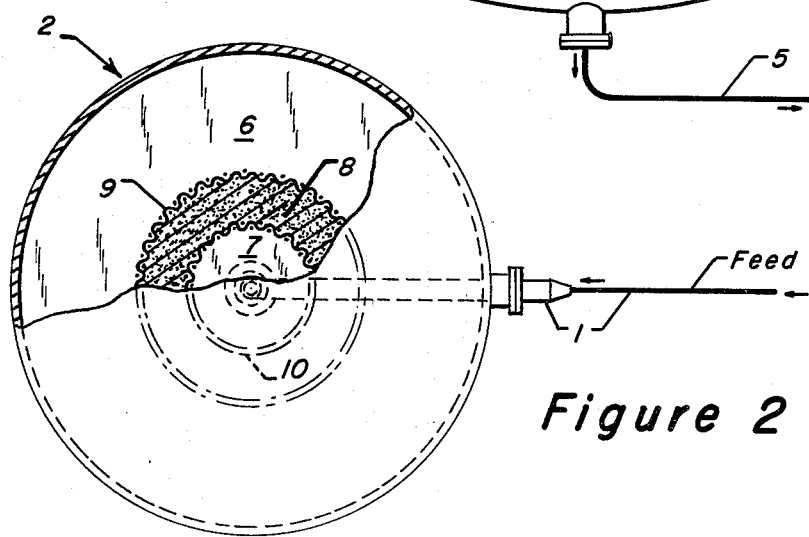
FIG. 2 is a cross-sectional view taken along a horizontal plane and looking downward into the apparatus shown in FIG. 1.

Referring now to FIG. 2, the annular structure of the bed of contacting media 8 may be more easily discerned from this view looking downward toward the bottom of the inside of the vessel. The contacting media is retained between the porous inner screen 10 and the porous outer screen 9. Also seen in this view is the upper surface of one of the open centered rings 6 which extends horizontally between the outer screen and the inner surface of the outer vessel 2. The upper surface of one of the circular disks 7 is seen at the center of FIG. 2.

FIG. 3 illustrates one of the many process embodiments of the subject invention. In this embodiment, a feed stream comprising liquid phase hydrocarbons enters an extraction zone 2 through line 1. The extraction zone has a structure similar to that shown in FIGS. 1 and 2. The hydrocarbon feed stream is the less dense liquid which enters the bottom of the extraction zone. It rises upward countercurrent to a descending stream of an aqueous solution of an alkali metal hydroxide, commonly referred to as caustic, which enters the extraction zone through line 3. Mercaptans which were present in the feed stream are removed from the ascending liquid by the countercurrent contact between the feed stream and the solvent stream. This forms a product stream of treated hydrocarbons which is removed from the process in line 4.

A stream of the used caustic which is rich in mercaptans is removed from the bottom of the extraction zone through line 5 and admixed with a quantity of air from line 14. The mixture of rich caustic and air is carried by line 15 to a mercaptan oxidation zone 16 wherein it passes upward through a fixed bed containing a catalytically effective material which promotes the oxidation of the mercaptans to disulfides. The mercaptan oxidation zone effluent stream is carried by line 17 to a phase separation zone 18. The less dense disulfides are allowed to separate from the aqueous caustic and are removed from the process through line 19. The thus-regenerated lean caustic is returned to the extraction zone through line 3.

DETAILED DESCRIPTION

Multistage countercurrent liquid-liquid extraction is widely used to perform purifications or separations in the food, chemical, petroleum and petrochemical industries. In these multistage operations, the two basic steps of the extraction process, contacting and separation, are each repeated several times in sequence. This sequence of operations may be performed in a wide variety of equipment. One type of equipment that is very widely used is the vertical extraction column. In this form of apparatus, the denser liquid stream is fed into an upper portion of the column, often at the top, and travels downward. The less dense liquid is fed into the bottom of the column and travels upward. Either liquid may be the feed stream or the solvent stream.

Two types of extraction columns are baffle towers and packed towers. Baffle towers are cylindrical towers in which horizontal baffles force the liquids to flow in a zig-zag path through the tower. Many different types of baffle arrangements have been devised, with each type resulting in a different liquid flow path through the column. These columns have a simple structure which makes fabrication and assembly relatively easy. They have the additional advantage that they do not utilize any small perforations or moving parts which may become plugged by substances circulating through the column or in other ways become inoperative. Baffle columns have the shortcoming that they do not provide the high degree of turbulence and admixture which is found in other types of columns, such as sieve columns, and they therefore have a lower actual extraction efficiency per contacting step.

Packed extraction columns are cylindrical vertically aligned towers which are filled with packing to reduce the vertical circulation of the continuous liquid phase present within the column. Normally these columns contain a single large bed of packing supported on a grate located near the bottom of the column. Packed columns also share the advantage of being relatively simple and economical to construct and have a fair degree of tolerance of solid or semi-solid particles contained in one of the entering fluid streams. Other types of extraction columns are known in the art and are widely used. However, these columns often have their own disadvantages, which may include a significant decrease in extraction efficiency at lower-than-designed liquid flow rates, a high degree of mechanical complexity which leads to higher construction costs and maintenance problems, or the requirement of a larger extraction column due to the greater distance required between each individual contacting stage.

It is an objective of the subject invention to provide an apparatus for the countercurrent multistage contacting of two immiscible liquids. It is another objective of the invention to provide an apparatus and a process for the extraction of mercaptans or aromatic hydrocarbons from a hydrocarbonaceous feed stream. It is a further objective of the invention to provide an apparatus which may be used in the multistage countercurrent contacting of a vapor stream and a liquid stream and which may be used in such processes as the scrubbing of a hydrogen sulfide containing gas stream with an aqueous amine solution.

The subject apparatus is contained within a cylindrical outer vessel constructed in accordance with the applicable standards or codes for vessel design. The outer vessel and the components located inside it are preferably constructed of a suitable metal, such as carbon steel or stainless steel. Other metals or reinforced plastics may also be used. The vessel is closed at the top and the bottom and is liquid-tight with the exception of the required liquid or vapor transfer lines. The outer vessel is vertically aligned and has a central cylindrical volume surrounded by the cylindrical side wall of the vessel. The vessel will have an inlet at the upper end for a liquid stream and an outlet for a liquid or vapor stream. The vessel will also have an inlet at its lower end for the less dense liquid or vapor phase stream and an outlet for the removal of the descending liquid stream. A significant volume may be provided below the lower inlet to allow the retention of a quantity of quiescent liquid in a settling or phase separation zone if the descending stream contains two immiscible liquids.

A major component of the subject apparatus is an annular bed of contacting media or packing which is centrally located within the outer vessel. Preferably, this bed of packing is vertically aligned and concentric with the vertical axis of the outer vessel. This annular bed may contain any standard commercial packing which is suitable for the intended use of the apparatus. The packing may be formed from crushed firebrick, Berl saddles, Raschig rings, coal, activated carbon, coke, woven wire mesh and a wide variety of ceramic and plastic packing materials of various sizes and shapes. The packing material should be relatively inert in the presence of the fluid employed within the apparatus and have a relatively large and curving surface area. The relative proportion of the width of the annular bed to the internal diameter of the outer vessel may vary significantly from that shown in the Drawing and will be determined based on a number of factors such as the fluids being contacted and their desired flow rates and concentrations. The width of the annular bed is measured along a radial direction between the two porous screens which confine the bed. It is envisioned that the annular bed would have a minimum width of approximately 0.15 meter and a maximum width of about 0.8 meter.

The annular bed of contacting media is retained between a pair of concentric particle retaining screens. These screens or walls each preferably have a total height equal to at least ¾ of the cylindrical side wall of the outer vessel. In practice, these screens would not be the monolithic structures depicted in the Drawing since they would most likely be fabricated within the outer vessel after the vessel has been erected at the site at which it is to be used. The porous screens will therefore normally be made up of many smaller pieces which are passed into the outer vessel through a manway or other opening. This fabrication will normally result in the screen containing small areas which are substantially imperforate, such as at the junction of the various structural components of the screen or at the location of reinforcing or support members which are attached to or in contact with the screen. The porous sections of the screens may be formed by perforated panels, woven wire screens, and similar types of commonly used porous construction material which allow substantially unhindered flow of the process fluid streams. It is preferred that the openings in the screen are of the maximum size which is practical for restraining the contacting media. It is preferred that the minimum distance across the openings in the screen is on the order of 0.5 cm.

The first or outer vertical particle retaining screen is located a distance which is radially inward from the inner surface of the outer vessel. There is thereby provided an open annular volume located between the outer surface of the first particle retaining screen and the inner surface of the outer vessel. The second vertical particle retaining screen is located a distance radially inward from the first particle retaining screen equal to the desired width of the bed of contacting media. An open cylindrical volume which preferably has a diameter greater than 0.3 meter is provided within the second particle retaining screen. The radial distance between the first particle retaining screen and the inner surface of the outer vessel is preferably at least 0.2 meter.

The cylindrical fluid transfer volume located within the second particle retaining screen is divided into a large number of shorter cylindrical volumes by a plurality of substantially imperforate disks which are vertically spaced apart within the larger cylindrical volume. Each of these disks preferably is attached to or closely abuts the inner surface of the second particle retaining screen in a substantially fluid-tight seal. The disks may be suspended from the wall or in the alternative, the disks may form a central structural member to which different components of the screen are attached. The disks are substantially horizontal and are preferably spaced apart at vertical distances which are greater than about 0.15 meter. It is preferred that between 10 and 120 of the disks are employed within the apparatus. Although the disks are preferably substantially horizontal and imperforate, the disks may be slightly slanted to one side or have one or more small perforations to allow for the drainage of liquid when the apparatus is shut down for maintenance or cleaning. The function of the disks is to prevent the vertical movement of any fluid between the shorter cylindrical volumes such that any fluid must pass through the porous screens and the bed of contacting media in order to either enter or leave the smaller cylindrical volumes located between adjacent disks.

The subject apparatus also includes a plurality of substantially horizontal and imperforate annular or open-centered rings. The number of these rings should be about equal to the number of imperforate disks which are used in the apparatus. The rings extend horizontally between the internal surface of the cylindrical side wall of the outer vessel and the outer surface of the first particle retaining screen to thereby divide the larger annular volume located between these two cylindrical surfaces into a number of smaller annular volumes. The function of the rings is to prevent the vertical movement of any fluid within the larger annular volume and to force the ascending fluid to flow horizontally into the bed of contacting media. The rings are vertically spaced apart at distances approximately equal to the spacing between adjacent imperforate disks. Except near the top and the bottom of the bed of contacting media, one of the imperforate rings is located at a vertical elevation which is between each pair of vertically adjacent imperforate disks. It is preferred that the rings are located at elevations which are at the approximate mid-point of the elevation of the corresponding pair of imperforate disks. However, the rings may be located at elevations which are slightly off-center to provide a somewhat different fluid flow path.

The fluid stream which is passed into the bottom of the apparatus may be either a liquid or a vapor phase stream. A flow distributor should be provided which causes the entering fluid to make its initial passage through the bed of contacting media in a manner which provides approximately equal fluid flow rates through all portions of the bed. This initial passage may be either inward into an enclosed portion of the central fluid transfer volume which is located below the lowermost imperforate disk or the initial passage may be outward as shown in FIG. 1 of the Drawing.

The rising fluid passes from one enclosed volume to another making a number of radial flow passes through the bed of contacting media equal to approximately twice the number of imperforate rings present in the apparatus. During each of these passes through the bed of contacting media, the upward flowing fluid is brought into intimate contact with the liquid stream which is flowing downward through the apparatus through the bed of contacting media. The flow rate of the rising fluid stream must not exceed the rate at which the horizontal fluid flow through the bed of contacting media would cause significant amounts of the descending liquid to be carried out of the contacting bed with the horizontally traveling fluid. This maximum flow rate may be determined by relatively conventional engineering calculations.

Any operational problem associated with the rising fluid causing the descending liquid to be pushed horizontally from the bed of contacting media is to some extent self-correcting for two reasons. The first of these reasons is that any of the descending liquid phase which is removed from the annular bed is collected on one of the imperforate disks or rings utilized in the apparatus.

The liquid would accumulate and flow toward one of the porous walls which encloses the contacting bed and would thereby re-enter the bed. A second self-correcting feature is that each passage of the rising fluid stream through the bed of contacting media is in the opposite radial direction from the immediately preceding passage. The descending liquid is therefore pushed from side to side rather than being subjected to a unidirectional force at all elevations within the bed.

The subject apparatus has many uses. It may be used as a liquid-liquid extraction column in a manner similar to a baffle column or a packed column. It may also be used when a rising vapor stream is scrubbed by a liquid stream, as for instance in the removal of acidic chemical compounds from a refinery off-gas or process stream by contact with an aqueous amine solution. The apparatus may also be used as a combination reactor and separator in those instances in which it is desired to have countercurrent flow of streams carrying two of the reactants. For instance, the subject apparatus may be utilized as an oxidation zone in which a caustic stream which is rich in mercaptans is contacted with a vapor stream containing air or another oxidizing agent. In this embodiment, the aqueous caustic would pass downward through the annular bed which would contain solids having a catalytic effect on the oxidation reaction. A vapor stream containing the oxidizing agent would enter the lower portion of the apparatus and pass upward in a circuitous path providing the oxygen required for the oxidation reaction. A quantity of the caustic would be retained in the bottom of the apparatus below the point at which the air entered to provide a sufficient liquid phase residence time for the disulfides formed in the oxidation reaction to separate from the denser aqueous caustic. The disulfides are then withdrawn from the apparatus through an additional withdrawal conduit. The annular bed may extend downward into the liquid retained within the bottom portion of the apparatus and therefore below the point at which the vapor stream containing the oxidizing agent is passed into the apparatus.

Those skilled in the art of vessel design will appreciate the multitude of variations in the detailed structure of the apparatus. For instance, the annular rings may be supported on loops fastened to the inner surface of the vessel. The rings may also be supported from below by vertical braces, with each brace resting on the next lower annular ring. It is also possible that the rings could be suspended from an upper portion of the apparatus. The disks at the center of the annular bed could also be held in position in any of these ways. For simplicity and clarity, these and other details of the apparatus are not shown in the Drawing. This is not intended to exclude from the scope of the claims these embodiments or other embodiments which result from the normal modification of the embodiments shown or described herein.

A first embodiment of the invention may be characterized as a fluid contacting apparatus which comprises a vertically oriented cylindrical outer vessel having a substantially cylindrical enclosed internal volume and an upper first end and a lower second end, and being formed in part by a cylindrical side wall having an inner surface; a porous first vertically oriented particle retaining screen located within the outer vessel a distance radially inward from the inner surface of the outer vessel and defining an annular fluid transfer volume between the first particle retaining screen and the inner surface of the outer vessel; a porous second vertically oriented particle retaining screen located within the first particle retaining screen a distance radially inward from the first particle retaining screen and defining an annular particle retention volume located between the first and the second particle retaining screens and also defining a cylindrical fluid transfer volume located within the second particle retaining screen; an annular bed of solid contacting media located within the annular particle retention volume and extending vertically from an uppermost quarter to a lowermost quarter of the internal volume of the outer vessel; a plurality of substantially horizontal and imperforate circular disks which are vertically spaced apart at distances greater than about 0.15 meter and which are located within the second particle retaining screen, with the circular disks having an outer edge which abuts the second particle retaining screen; a plurality of substantially horizontal and imperforate annular rings which are vertically spaced apart at distances greater than 0.15 meter at vertical elevations substantially intermediate the circular disks, with the annular rings being located within the annular fluid transfer volume and engaging both the inner surface of the cylindrical side wall of the outer vessel and the outer surface of the first particle retaining screen; a first fluid inlet means communicating with the internal volume of the outer vessel at a point in the lowermost quarter of the internal volume of the outer vessel; a first fluid outlet means communicating with the internal volume of the outer vessel at a point below the annular bed of solid contacting media; a second fluid outlet means communicating with the internal volume of the outer vessel at a point above the annular bed of solid contacting media; and, a second fluid inlet means communicating with the internal volume of the outer vessel at a point directly above the annular bed of solid contacting media.

One of the more widely used extraction processes to which the present invention may be applied is the separation of aromatic hydrocarbons and non-aromatic hydrocarbons such as naphthenes and paraffins. This may be for the purpose of obtaining relatively pure portions of either class of hydrocarbon. This operation is often performed in conjunction with fractionation and/or extractive distillation steps needed to recover the solvent. An example of this is the process described in U.S. Pat. No. 3,844,902. The feed stream will preferably have a limited boiling point range which limits the hydrocarbons to those having from about 6 to 20 carbon atoms per molecule and more preferably from about 6 to 12 carbon atoms. Suitable feed streams include a debutanized reactor effluent from a catalytic reforming unit and a liquid by-product from a pyrolysis gasoline unit which has been hydrotreated for the saturation of olefins and diolefins.

At the heart of the extraction process, is the use of a solvent which is selective for the preselected chemical compound which is to be removed from the feed stream. Besides having this property of selectivity, the solvent material must be substantially immiscible with the feed stream and must also differ in density. There are available and known to those skilled in the art a wide variety of materials which meet these general requirements. For instance, aromatic hydrocarbons may be extracted with a diglycol amine, diethylene glycol, dipropylene glycol, tetraethylene glycol or n-formyl morpholine, etc. These chemicals are usually mixed with water to form the actual solvent solution. More detailed information on these solvents is contained in the articles appearing at page 91 of the March, 1973 edition of *Hydrocarbon Processing* and at page 141 of the April, 1972 edition.

A specifically preferred solvent for the separation of aromatics and non-aromatics is one of the sulfolane-type as described in U.S. Pat. No. 3,652,452. A sulfolane-type solvent may be characterized as having a five-membered ring structure containing one sulfur atom and four carbon atoms with two oxygen atoms bonded to the sulfur atom. Preferably, two hydrogen atoms are bonded to each carbon atom. A specific example of a sulfolane-type solvent is tetrahydrothiophene 1,1,dioxide. It is specifically preferred that the solvent contains about 0.5 to 5.0 wt.% water. The closely related solvents 2-sulfolene and 3-sulfolene may also be used. Yet another family of suitable compounds are the sultones described in U.S. Pat. No. 3,723,303. The feed streams which are contacted with these solvents may contain aromatic and non-aromatic hydrocarbons having from six to nine or more carbon atoms per molecule.

Adequate extraction is obtained through the use of multi-stage countercurrent contacting performed at suitable extraction conditions. When utilizing a sulfolane-type solvent, these conditions include a pressure from atmospheric to about 35 atm., preferably 3 to 10 atm., and a temperature of from about 25° C. to about 200° C., preferably about 80° C. to about 150° C. These conditions are often set by very practical considerations. For instance, the pressure must be sufficient to prevent either liquid phase from vaporizing and is often determined by an upstream or downstream unit on which the pressure in the extraction zone is allowed to "float". Elevated temperatures normally increase the extraction capacity of the solvent but decrease the selectivity such that these effects must be balanced. Solvent quantities should be sufficient to dissolve substantially all the aromatic hydrocarbons present in the extraction zone feed stream. Preferred are solvent to feed ratios, by volume of about 2:1 to about 10:1. These factors are well developed in the art and are dependent on particular situations.

A broad process embodiment of the invention may be characterized as a liquid-liquid extraction process which comprises the steps of passing a solvent stream into the upper portion of a vertically oriented extraction column and downward through the column, with substantially all of the solvent stream traveling downward within an annular bed of contacting media which is vertically oriented and centrally located within the column; passing a liquid-phase feed stream comprising hydrocarbons into the bottom of the extraction column and upward through the column in a sigmoid path which includes a plurality of radial flow passages through the bed of contacting media, and with each passage of the feed stream through the bed of contacting media being in the opposite radial direction and at a higher vertical elevation than the immediately preceding passage of the feed stream through the bed of contacting media; withdrawing a raffinate stream from the top of the extraction column; and, withdrawing an extract stream from the bottom of the extraction column.

The raffinate stream comprises the unextracted or remaining portion of the feed stream, and the extract stream comprises the solvent stream plus the extracted portion of the feed stream. The raffinate stream may have a small amount of the solvent dissolved in it. In some processes, it is customary to refer to the extract stream as the rich solvent stream.

The subject invention may also be used for the extraction of mercaptans from a hydrocarbon feed stream with an alkaline solution as is widely practiced in the petroleum industry. This alkaline solution is then effectively regenerated by the catalytically promoted oxidation of the extractive mercaptans to disulfides which are separated by decantation. The process may be performed with any alkaline reagent which is capable of extracting mercaptans from the feed stream at practical operating conditions and which may be regenerated in the manner described. A preferred reagent comprises an aqueous solution of an alkaline metal hydroxide, such as sodium hydroxide or potassium hydroxide. Sodium hydroxide may be used in concentrations of from 1–50 wt.%, with a preferred concentration range being from about 5 to about 25 wt.%. Optionally, there may be added an agent to increase the solubility of mercaptans in the solution, typically methanol or ethanol, although others such as a phenol, cresol or butyric acid may be used.

Hydrocarbons which may be treated for mercaptan removal in this manner vary from propane-butane mixtures to the middle distillates. Included in this grouping of feed streams are streams derived from fluidized catalytic cracking plant gas concentration units, natural or cracked gasolines, jet fuels, fuel oils and kerosenes and blends of these. This process may also be used to remove mercaptans from many solvents, alcohols, aldehydes, etc. With the exception of some light $C_3$ or $C_4$ compounds, these materials may be classified as being normally liquid hydrocarbonaceous compounds having boiling points under about 345° C. as determined by the standard ASTM distillation methods. As used herein, the term "normally liquid" is intended to specify a substance which is a liquid at standard conditions (60° F. and 1 atm. absolute).

The extraction conditions employed for removing mercaptans may vary greatly depending on such factors as the nature of the hydrocarbon stream being treated and its mercaptan content. In general, the extraction may be performed at an ambient temperature and a pressure sufficient to insure liquid state operation. The pressure may range up to 68 atm. gauge or more, but a pressure in the range from about 3.5 atm. gauge to about 10.0 atm. gauge is preferred. The temperature in the extraction zone is confined in the range of 16° C. to about 121° C., preferably from 25° C. to 50° C. The ratio of the volume of the alkali solution required per volume of the feed stream will vary depending on the mercaptan content of the feed stream. The flow rate of the alkaline solution may be from about 1 to about 100% of the flow rate of the hydrocarbon stream. Normally, the rate will equal about 2 to 3% of an LPG stream and up to about 20% of a $C_5$ or light straight run gasoline. Optimum extraction in this liquid system is obtained with a velocity through sieve-type perforations of from about 5 to about 10 ft/sec. Further details on this process may be obtained in the previously referred to U.S. Pat. Nos. 2,921,020; 2,988,500; 3,108,081; 3,260,665; 3,923,645 and 4,040,947.

The invention may also be applied in a process for removing acid gases, such as hydrogen sulfide, from liquid-phase hydrocarbon streams or from vapor-phase streams. This well developed process is widely used in petroleum refining, with aqueous amine solutions being the preferred solvents. Diglycolamine at concentrations ranging from about 50 to 70 wt.% or monoethanolamine at concentrations ranging from about 10 to about 30 wt.% may be used. It is conventional to limit the concentration of $H_2S$ in the $H_2S$-rich monoethanolamine to less than about 0.35 to 0.4 moles of $H_2S$ per mole of MEA. A positive pressure sufficient to maintain liquid phase conditions and preferably above 1 atm gauge is maintained in the extraction column. The use of an average temperature below 38° C. is preferred during the extraction process, but the temperature may range from about 16° C. to about 65° C. The rich solvent is regenerated in a stripping column at an elevated temperature in a customary manner, with a temperature in the range of 115° C. to 150° C. normally being sufficient.

I claim as my invention:

1. A fluid contacting apparatus which comprises:
   (a) a vertically oriented cylindrical outer vessel having a substantially cylindrical enclosed internal volume and an upper first end and a lower second end, and being formed in part by a cylindrical side wall having an inner surface;
   (b) a porous first vertically oriented particle retaining screen located within the outer vessel a distance radially inward from the inner surface of the outer vessel and defining an annular fluid transfer volume between the first particle retaining screen and the inner surface of the outer vessel;
   (c) a porous second vertically oriented particle retaining screen located within the first particle retaining screen a distance radially inward from the first particle retaining screen and defining an annular particle retention volume located between the first and the second particle retaining screens and also defining a cylindrical fluid transfer volume located within the second particle retaining screen;
   (d) an annular bed of solid contacting media located within the annular particle retention volume and extending vertically from an uppermost quarter to a lowermost quarter of the internal volume of the outer vessel;
   (e) a plurality of substantially horizontal and imperforate circular disks which are vertically spaced apart at distances greater than about 0.15 meter and which are located within the second particle retaining screen, with the circular disks having an outer edge which abuts the second particle retaining screen;
   (f) a plurality of substantially horizontal and imperforate open-centered rings which are vertically spaced apart at distances greater than 0.15 meter at vertical elevations substantially intermediate the circular disks, with the open-centered rings being located within the annular fluid transfer volume and engaging both the inner surface of the cylindrical side wall of the outer vessel and the outer surface of the first particle retaining screen;
   (g) a first fluid inlet means communicating with the internal volume of the outer vessel at a point in the lowermost quarter of the internal volume of the outer vessel;
   (h) a first fluid outlet means communicating with the internal volume of the outer vessel at a point below the annular bed of solid contacting media;
   (i) a second fluid outlet means communicating with the internal volume of the outer vessel at a point above the annular bed of solid contacting media; and,
   (j) a second fluid inlet means communicating with the internal volume of the outer vessel at a point directly above the annular bed of solid contacting media.

* * * * *